United States Patent
Vanska et al.

(10) Patent No.: US 9,158,334 B2
(45) Date of Patent: Oct. 13, 2015

(54) ELECTRONIC DEVICE CONTROLLED BY FLEXING

(71) Applicant: Nokia Corporation, Espoo (FI)

(72) Inventors: Anssi I. Vanska, Helsinki (FI); Matti Kosonen, Jarvenpaa (FI); Antti Salo, Lohja (FI); Sami Myyrylainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 151 days.

(21) Appl. No.: 13/657,341

(22) Filed: Oct. 22, 2012

(65) Prior Publication Data

US 2014/0111549 A1    Apr. 24, 2014

(51) Int. Cl.
G06F 1/16    (2006.01)

(52) U.S. Cl.
CPC ............ *G06F 1/1626* (2013.01); *G06F 1/1652* (2013.01); *G06F 1/1656* (2013.01); *G06F 1/1675* (2013.01)

(58) Field of Classification Search
CPC ... G06F 1/1626; G06F 1/1675; G06F 1/1656; G06F 1/1652
USPC ......................................... 361/679.15, 679.27
See application file for complete search history.

(56) References Cited

U.S. PATENT DOCUMENTS

| | | |
|---|---|---|
| 1,410,366 A | 3/1922 | Buchman |
| 3,880,500 A | 4/1975 | Kojabashian ................. 359/847 |
| 4,483,020 A | 11/1984 | Dunn ................................ 2/2.5 |
| 5,007,108 A | 4/1991 | Laberge et al. ........................ 2/2 |
| 5,214,623 A | 5/1993 | Seager .............................. 368/10 |
| 5,588,167 A | 12/1996 | Pahno et al. ....................... 5/606 |
| 5,706,026 A | 1/1998 | Kent et al. ...................... 345/156 |
| 5,771,489 A | 6/1998 | Snedeker ......................... 2/12.5 |
| 5,795,430 A | 8/1998 | Beeteson et al. .............. 156/350 |
| 5,923,318 A | 7/1999 | Zhai et al. ..................... 345/157 |
| 6,160,540 A | 12/2000 | Fishkin et al. ................ 345/184 |
| 6,441,809 B2 | 8/2002 | Kent et al. ..................... 345/177 |

(Continued)

FOREIGN PATENT DOCUMENTS

| | | |
|---|---|---|
| CN | 1598870 A | 3/2005 |
| CN | 1617614 A | 5/2005 |

(Continued)

OTHER PUBLICATIONS

Mina; *Samsung Unveils Flexible Android Smartphone*; http://www.androidauthority.com/samsung-unveils-flexible-android-smartphone-24933/ (8 pages), Sep. 21, 2011.

(Continued)

*Primary Examiner* — Jeremy C Norris
*Assistant Examiner* — Nathan Milakovich
(74) *Attorney, Agent, or Firm* — Harrington & Smith

(57) ABSTRACT

An apparatus comprising: a flexible body comprising an arrangement for limiting flexing of the body, the arrangement comprising: a first part within the body; a second part within the body; a flexible interconnect extending at least between the first part and the second part wherein the arrangement is configured to change between a first configuration, in which a portion of the interconnect between the first part and the second part is of a variable length enabling more and less flexing of the interconnect, and a second configuration, in which the portion of the interconnect between the first part and the second part has a limited length that limits one or both of more flexing and less flexing.

20 Claims, 6 Drawing Sheets

(56) References Cited

U.S. PATENT DOCUMENTS

| | | | |
|---|---|---|---|
| 6,556,189 B1 | 4/2003 | Takahata et al. | 345/173 |
| 6,557,177 B2 | 5/2003 | Hochmuth | 2/159 |
| 7,075,527 B2 | 7/2006 | Takagi et al. | 345/184 |
| 7,443,380 B2 | 10/2008 | Nozawa | 345/156 |
| 7,456,823 B2 | 11/2008 | Poupyrev et al. | 345/173 |
| 8,194,399 B2* | 6/2012 | Ashcraft et al. | 361/679.05 |
| 8,380,327 B2* | 2/2013 | Park | 700/1 |
| 8,619,021 B2 | 12/2013 | Hayton | 345/107 |
| 8,780,540 B2* | 7/2014 | Whitt et al. | 361/679.09 |
| 8,780,541 B2* | 7/2014 | Whitt et al. | 361/679.09 |
| 2001/0033275 A1 | 10/2001 | Kent et al. | 345/173 |
| 2002/0033798 A1 | 3/2002 | Nakamura et al. | 345/156 |
| 2002/0167495 A1 | 11/2002 | Quinn et al. | 345/173 |
| 2003/0144034 A1 | 7/2003 | Hack et al. | 455/566 |
| 2003/0147205 A1 | 8/2003 | Murphy et al. | 361/680 |
| 2003/0210801 A1* | 11/2003 | Naksen et al. | 381/370 |
| 2003/0214485 A1 | 11/2003 | Roberts | 345/173 |
| 2003/0227441 A1 | 12/2003 | Hioki et al. | 345/156 |
| 2004/0008191 A1 | 1/2004 | Poupyrev et al. | 345/184 |
| 2004/0017355 A1 | 1/2004 | Shim | 345/157 |
| 2004/0035994 A1 | 2/2004 | Cho et al. | 248/276.1 |
| 2004/0046739 A1 | 3/2004 | Gettemy | 345/158 |
| 2004/0239631 A1 | 12/2004 | Gresham | |
| 2005/0051693 A1 | 3/2005 | Chu | 248/371 |
| 2005/0057527 A1 | 3/2005 | Takenaka et al. | 345/173 |
| 2005/0140646 A1 | 6/2005 | Nozawa | 345/156 |
| 2005/0162389 A1 | 7/2005 | Obermeyer et al. | 345/161 |
| 2005/0237308 A1 | 10/2005 | Autio et al. | 345/173 |
| 2006/0007151 A1 | 1/2006 | Ram | 345/163 |
| 2006/0077672 A1 | 4/2006 | Schaak | |
| 2006/0199999 A1 | 9/2006 | Ikeda et al. | |
| 2006/0238494 A1 | 10/2006 | Narayanaswami et al. | 345/156 |
| 2007/0040810 A1 | 2/2007 | Dowe et al. | 345/173 |
| 2007/0154254 A1 | 7/2007 | Bevirt | 403/56 |
| 2007/0205997 A1 | 9/2007 | Lieshout et al. | 345/204 |
| 2008/0018631 A1 | 1/2008 | Hioki et al. | 345/206 |
| 2008/0042940 A1 | 2/2008 | Hasegawa | 345/76 |
| 2008/0251662 A1 | 10/2008 | Desorbo et al. | |
| 2009/0058828 A1 | 3/2009 | Jiang et al. | 345/173 |
| 2009/0088204 A1 | 4/2009 | Culbert et al. | 455/556.1 |
| 2009/0115734 A1 | 5/2009 | Fredriksson et al. | 345/173 |
| 2009/0184921 A1 | 7/2009 | Scott et al. | 345/156 |
| 2009/0219247 A1 | 9/2009 | Watanabe et al. | 345/157 |
| 2009/0237872 A1 | 9/2009 | Bemelmans et al. | 361/679.01 |
| 2009/0244013 A1 | 10/2009 | Eldershaw | 345/173 |
| 2009/0326833 A1 | 12/2009 | Ryhanen et al. | 702/33 |
| 2010/0011291 A1 | 1/2010 | Nurmi | 715/702 |
| 2010/0013939 A1 | 1/2010 | Ohno et al. | 348/208.5 |
| 2010/0108828 A1 | 5/2010 | Yu et al. | |
| 2010/0141605 A1 | 6/2010 | Kang et al. | 345/174 |
| 2010/0164888 A1 | 7/2010 | Okumura et al. | 345/173 |
| 2010/0228295 A1 | 9/2010 | Whitefield | |
| 2010/0238612 A1 | 9/2010 | Hsiao et al. | 361/679.01 |
| 2010/0263245 A1 | 10/2010 | Bowser | 40/517 |
| 2011/0057873 A1 | 3/2011 | Geissler et al. | 345/156 |
| 2011/0062703 A1 | 3/2011 | Lopez et al. | 285/129.1 |
| 2011/0080155 A1 | 4/2011 | Aldridge | 323/318 |
| 2011/0095999 A1 | 4/2011 | Hayton | 345/173 |
| 2011/0167391 A1 | 7/2011 | Momeyer et al. | 715/863 |
| 2011/0181494 A1 | 7/2011 | Wong et al. | 345/1.3 |
| 2011/0193771 A1 | 8/2011 | Chronqvist | 345/156 |
| 2011/0227822 A1* | 9/2011 | Shai | 345/156 |
| 2011/0241822 A1 | 10/2011 | Opran et al. | 340/4.31 |
| 2012/0206375 A1 | 8/2012 | Fyke et al. | 345/173 |
| 2013/0178344 A1* | 7/2013 | Walsh et al. | 482/122 |
| 2013/0194207 A1* | 8/2013 | Andrew et al. | 345/173 |
| 2013/0197819 A1* | 8/2013 | Vanska et al. | 702/33 |
| 2013/0286553 A1* | 10/2013 | Vanska et al. | 361/679.01 |
| 2013/0335929 A1 | 12/2013 | Cavallaro | 361/749 |
| 2014/0003006 A1 | 1/2014 | Ahn | 361/749 |

FOREIGN PATENT DOCUMENTS

| | | |
|---|---|---|
| CN | 101430601 A | 5/2009 |
| EP | 1770965 A1 | 4/2007 |
| EP | 1830336 A1 | 9/2007 |
| EP | 2315186 A2 | 4/2011 |
| EP | 2508960 A2 | 10/2012 |
| JP | 2004046792 A | 2/2004 |
| JP | 2004192241 A | 7/2004 |
| KR | 2006-0134130 A | 12/2006 |
| KR | 20090006807 A | 1/2009 |
| KR | 2009-001161 A | 2/2009 |
| TW | 200404248 A | 3/2004 |
| WO | WO 00/60438 A | 10/2000 |
| WO | WO-2005/093548 A1 | 10/2005 |
| WO | WO 2009/050107 A2 | 4/2009 |
| WO | WO-2010/041227 A1 | 4/2010 |
| WO | WO 2011/117681 A1 | 9/2011 |
| WO | WO 2011117681 A1 | 9/2011 |
| WO | WO 2011/144972 A1 | 11/2011 |
| WO | WO-2013/160737 A1 | 10/2013 |

OTHER PUBLICATIONS

"How Users Manipulate Deformable Displays as Input Devices", Sang-Su Lee et al Apr. 10-15, 2010, (pp. 1647-1656).

"Gummi: A bendable computer", Dr Ivan Poupyrev—http://ivanpoupyrev.com/projects/gummi.php, (1994-2012), (7 pages).

"Murata Tactile controller TV remote hands-on (video)", Zach Honig—http://www.engadget.com2011/10/05/murata-tactile-controller-tv-remote-ands-on-vi . . . , (2012), (8 pages).

"Press release: revolutionary new paper computer shows flexible future for smartphones and tablets", http://www.hml.queensu.ca/paperphone, (2012), (2 pages).

Smith, Matt; *Nokia's kinetic future: flexible screens and a twisted interface*; Oct. 26, 2012; http://www.engadget.com/2011/10/26/nokias-kinetic-future-flexible-screens-and-a-twisted-interface/ (4 pages).

\* cited by examiner

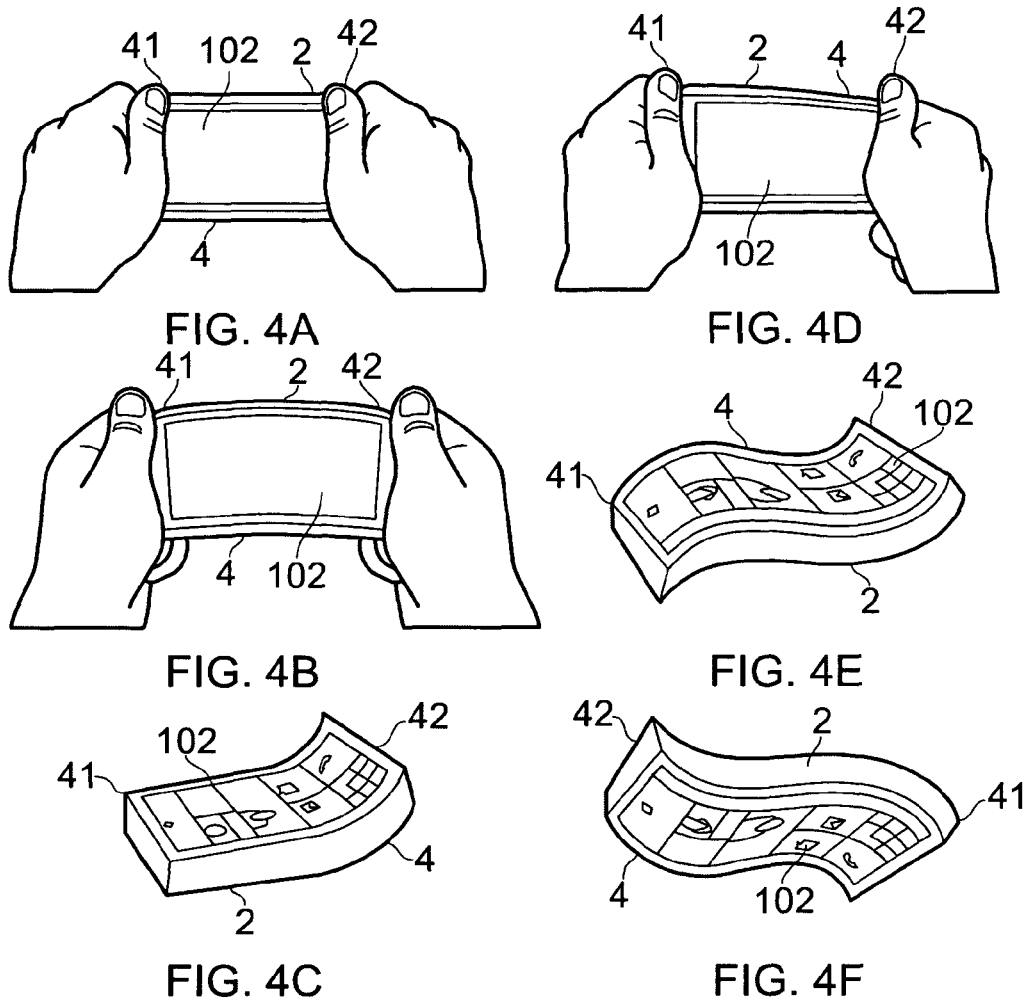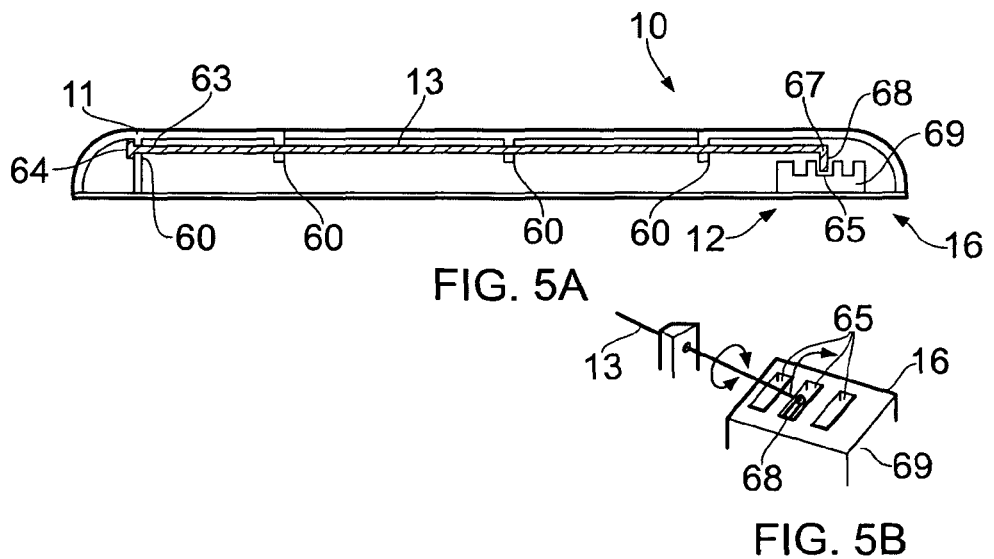

ELECTRONIC DEVICE CONTROLLED BY FLEXING

TECHNOLOGICAL FIELD

Embodiments of the present invention relate to controlling contortion of an apparatus.

BACKGROUND

There are various different ways in which a user can control an apparatus via a man-machine-interface (MMI). For example, the apparatus may comprise a cursor control device such as a mouse or trackball. For example, the apparatus may have devices that enable tactile actuation such as keys, touch screens etc. For example, the apparatus may have devices that enable audio actuation such as a microphone and voice recognition circuitry.

BRIEF SUMMARY

It would be desirable to control contortion of an apparatus. Examples of contortion include bending or twisting or bending and twisting of an apparatus.

According to various, but not necessarily all, embodiments of the invention there is provided an apparatus comprising: a flexible body comprising an arrangement for limiting flexing of the body, the arrangement comprising: a first part within the body; a second part within the body; a flexible interconnect extending at least between the first part and the second part wherein the arrangement is configured to change between a first configuration, in which a portion of the interconnect between the first part and the second part is of a variable length configured to enable more and less flexing of the interconnect, and a second configuration, in which the portion of the interconnect between the first part and the second part has a limited length that is configured to limit one or both of more flexing and less flexing.

BRIEF DESCRIPTION

For a better understanding of various examples of embodiments of the present invention reference will now be made by way of example only to the accompanying drawings in which:

FIGS. 4A-4F illustrate examples of flexed states that may be locked by the second configuration;

FIGS. 5A & 5B illustrate an example of a lock;

DETAILED DESCRIPTION

Figure 1A:
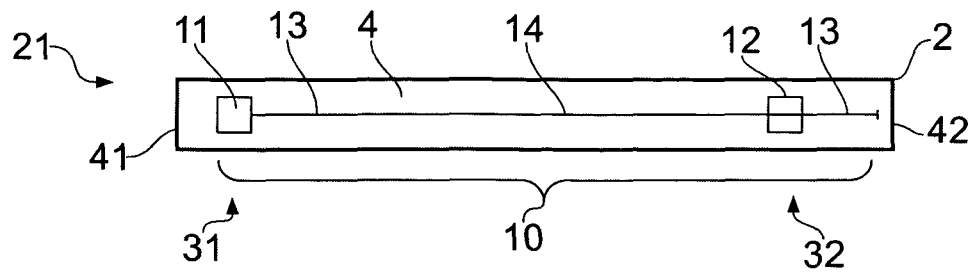
FIGS. 1A, 1B, 1C and 1D illustrate cross-sections through an example of an apparatus when it is in a first configuration and is respectively not flexed, convexly flexed, not flexed and concavely flexed.

The Figures illustrate an apparatus 2 comprising: a flexible body 4 comprising an arrangement 10 for limiting flexing of the body 4, the arrangement 10 comprising: a first part 11 within the body 4; a second part 12 within the body 4; and a flexible interconnect 13 extending at least between the first part 11 and the second part 12 wherein the arrangement 10 is configured to change between a first configuration 21, in which a portion 14 of the interconnect 13 between the first part 11 and the second part 12 is of a variable length enabling more or less flexing of the interconnect 13, and a second configuration 22, in which the portion 14 of the interconnect 13 between the first part 11 and the second part 12 has a limited length that limits one or both of more flexing and less flexing.

In the following, reference will be made to various labelled features and functions. It should be understood that such features may be present in some but not necessarily all examples. It should be understood that such functions may be performed by some but not necessarily all examples.

In some but not necessarily all examples, the apparatus 2 is an electronic apparatus that comprises within its body 4 electronic components.

In this document flexing and contortion are both used to mean deformation of the body 4 by twisting and/or bending. The extent of flexing/contortion facilitated by the body 4 depends upon implementation. Resilient flexing/contortion implies that the body 4 stays in its contorted state while held in that state and returns to its equilibrium shape when released.

In some but not necessarily all embodiments, the apparatus 2 is resiliently flexible in the first configuration 21 and becomes inflexible in the second configuration 22.

FIGS. 1A, 1B, 1C and 1D illustrate cross-sections through an example of an apparatus 2 when it is in a first configuration 21 and is respectively not flexed, convexly flexed, not flexed and concavely flexed.

It should be appreciated that the examples of flexing illustrated are non-exhaustive examples of flexing. The apparatus 2 may be configured to enable one or more different types of flexing, which may be performed in addition to or as an alternative to the types of flexing (concave and convex) illustrated. The apparatus 2 may be configured to enable one or more different types of flexing, for example, as illustrated in FIGS. 4A to 4F. As will be appreciated from FIGS. 4A to 4F flexing encompasses not only bending but also twisting.

The apparatus 2 comprises a flexible body 4 that is configured to flex. The body may comprise material that compresses under a compressive force and extends under a tensile force. Such material, in some examples, may be resilient. For example, the material may be elastic and attempt to return to an uncompressed state when compressed and return to an un-extended state when extended (stretched).

As can be seen from FIGS. 1A-1D, when the apparatus 2 is in a first configuration 21, a user is able to flex that apparatus with at least one degree of freedom.

Figure 1B:
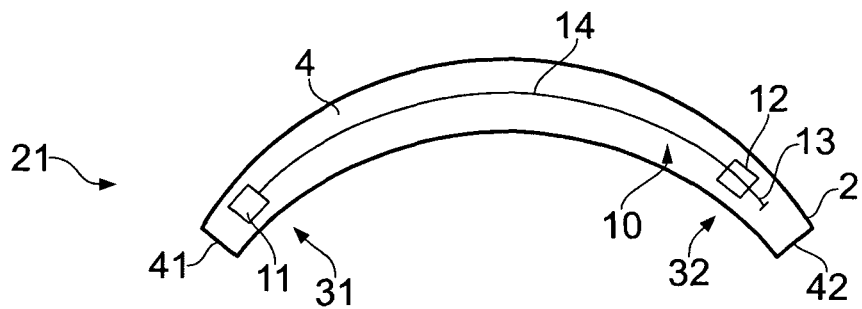
Figure 1C:
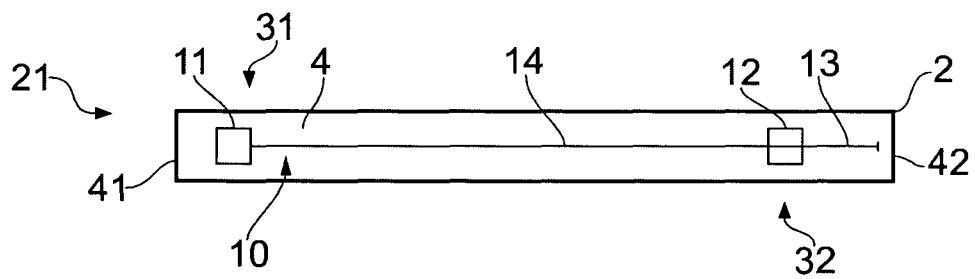
Figure 1D:
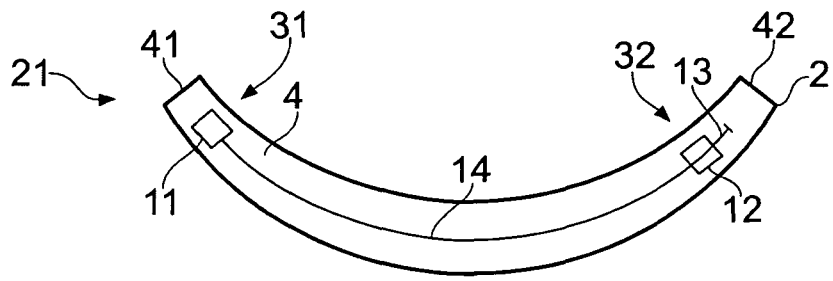

When the apparatus 2 is in a flexed state, for example bent as illustrated in FIG. 1B or 1D, the outer portion of the apparatus on the outer curve of the flexed apparatus 2 is under tensile strain and extends in length compared to the non-flexed state illustrated in FIG. 1A. The inner portion of the apparatus on the inner curve of the flexed apparatus 2 is under compressive strain and shortens in length compared to the non-flexed state illustrated in FIG. 1A. Somewhere at or between the outer portion and the inner portion there is an equilibrium plane where the compressive strain and tensile strain cancel each other and the length of the apparatus 2 along the equilibrium plane is the same compared to the non-flexed state.

Figure 2A:
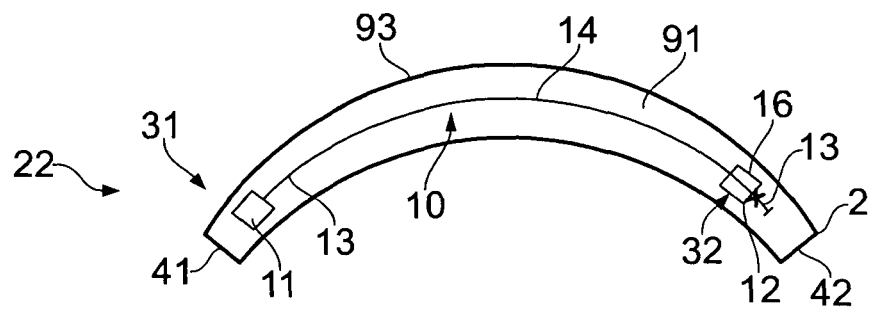
FIGS. 2A, 2B and 2C illustrate cross-sections through examples of the apparatus, that use different locks for the second configuration.
Figure 2B:
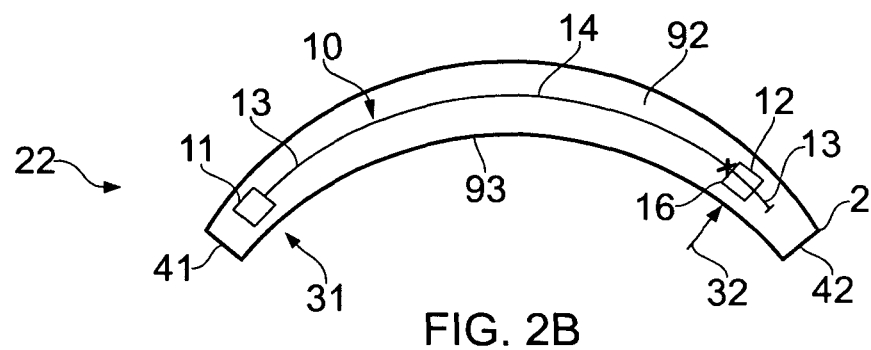
Figure 2C:
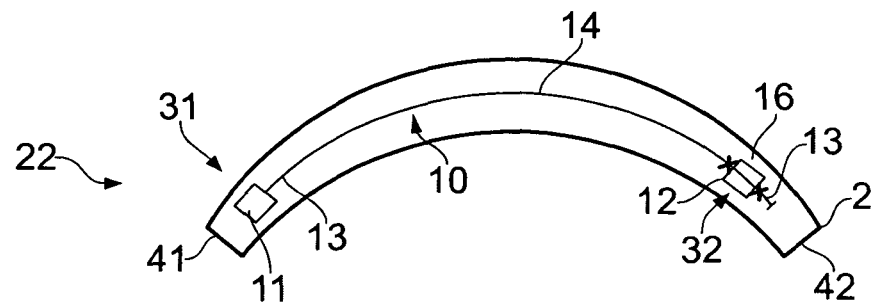

FIGS. 2A, 2B and 2C illustrate cross-sections through an example of the apparatus 2 when it is in a second configuration 22 and is locked in a flexed state. The mechanism for locking is different in the illustrated examples.

When the configuration of the apparatus 2 is changed from the first configuration 21 to the second configuration 22, a current flexed state of the apparatus is locked. Locking of the flexed state limits how the flexed state may change. It may for example only be capable of becoming more flexed but not less flexed, alternatively it may only be capable of becoming less flexed but not more flexed, and alternatively it may be fixed and be incapable of becoming more flexed and incapable of becoming less flexed.

When the configuration of the apparatus 2 is changed from the second configuration 22 to the first configuration 21, the locked flexed state of the apparatus is unlocked such that the flexed state can be changed by a user to become more flexed and also less flexed.

To limit flexing of the apparatus 2, the apparatus comprises an arrangement 10 configured to limit extension of the body 4 under tensile forces and/or configured to limit shortening of the body 4 under compressive forces.

The arrangement 10 comprises a first part 11 within the body 4; a second part 12 within the body 4; and a flexible interconnect 13 extending at least between the first part 11 and the second part 12. In the illustrated example, the arrangement 10 is located wholly within the body 4.

Configurations of the apparatus 2 and the arrangement 10 are interdependent and transitions between the first configuration 21 of the apparatus 2 and the second configuration 22 of the apparatus 2 occur simultaneously with transitions between a first configuration of the arrangement 10 and a second configuration of the arrangement 10. The same references 21, 22 will be used to refer to the first configuration 21 and the second configuration 22 of the apparatus 2 and the arrangement 10.

The apparatus 2 has, in this example, a length that is fixed and independent of the configuration of the arrangement 10.

The arrangement 10 is configured to change between the first configuration 21 and the second configuration 22.

The arrangement 10 may also be configured to change between the second configuration 22 and the first configuration 21.

When in the first configuration 21, a portion 14 of the interconnect 13 between the first part 11 and the second part 12 is of a variable length enabling flexing of the interconnect 13. For example, as illustrated in FIGS. 1A-1D, when the apparatus 2 flexes the portion 14 of the interconnect 13 between the first portion 11 and the second portion 12 increases and decreases in length.

When the apparatus 2 is flexed, for example bent, if the interconnect 13 is located in the outer portion of the apparatus 2 on the outer curve of the flexed apparatus 2, then it is under tensile strain and the portion 14 of the interconnect 13 between the first part 11 and the second part 12 extends in length compared to the non-flexed state. However, if the interconnect 13 is located in the inner portion of the apparatus 2 on the inner curve of the flexed apparatus 2, then it is under compressive strain and the portion 14 of the interconnect 13 between the first part 11 and the second part 12 shortens in length compared to the non-flexed state.

The interconnect 13 may be significantly displaced from the equilibrium plane to achieve greater shortening/lengthening of the portion 14 of the interconnect 13 between the first part 11 and the second part 12 when flexing occurs.

The interconnect 13 extends longitudinally between the first part 11 and the second part 12. The interconnect 13 may be of fixed length. The interconnect 13 may be located wholly within the body 4. The interconnect 13 may comprise a support or chassis for the body 4. The interconnect may be stiff longitudinally and flexible transversely.

In the examples of FIGS. 1A to 1D and FIGS. 2A to 2C, the interconnect 13 is illustrated as a single component. However, in other examples, the interconnect 13 may be formed from a series of interconnected links.

The interconnect 13 may be constrained by the body 4. In some embodiments, flexing of the interconnect 13 causes flexing of the body 4. In other embodiments, flexing of the body 4 causes flexing of the interconnect 13.

In the example illustrated, but not necessarily all examples, the first part 11 has a fixed first position 31 within the body 4 at or towards an extremity of a first side 41 of the body 4. The second part 12 has a fixed second position 32 within the body 4 at or towards a second, opposing, extremity of a second opposing side 42 of the body 4. The first part 11 does not move from the fixed first position 31 when the configuration of the apparatus/arrangement changes nor during flexing of the apparatus/interconnect. The second part 12 does not move from the fixed second position 32 when the configuration of the apparatus/interconnect changes nor during flexing of the apparatus/interconnect.

Referring to FIGS. 2A, 2B and 2C, when in the second configuration 22, the portion 14 of the interconnect 13 between the first part 11 and the second part 12 is flexed and changes to the length of the portion 14 are limited. The limit may prevent the length of the portion from increasing or from decreasing or from both increasing and decreasing, compared to a reference length of the portion 14. The reference length may be defined as the length of the portion 14 when the arrangement changes from the first configuration 21 to the second configuration 22.

In these examples a lock 16 at the second part 12 is used to prevent the length of the portion 14 from increasing (FIG. 2A) or from decreasing (FIG. 2B) or from both increasing and decreasing (FIG. 2C), when it is in a locked state.

The lock 16 may, for example, fix the minimum length of the portion 14 of the interconnect 13 so that the portion 14 can lengthen to be greater than the reference length but cannot shorten to be less than the reference length (FIG. 2A).

Alternatively or additionally, the lock 16 may, for example, fix the maximum length of the portion 14 of the interconnect 13 so that the portion 14 can shorten to be less than the reference length but cannot lengthen to be greater than the reference length (FIG. 2B).

Alternatively or additionally, the lock 16 may, for example, fix the length of the portion 14 of the interconnect 13. It may, for example be fixed at the reference length. In this example, the portion 14 cannot shorten to be less than the reference length nor lengthen to be greater than the reference length (FIG. 2O).

In the examples of FIGS. 2A-2C, the interconnect 13 is fixed at the first part 11 and the lock 16 is fixed to the second part 12.

If the interconnect 13 is positioned in an inner portion 91 of the apparatus 2 (on the inside of a bend of the apparatus 2 compared to an equilibrium plane 93) as illustrated in FIG. 2A, then if the second configuration 22 of the arrangement 10 prevents lengthening of the interconnect 13 then less flexing of the apparatus 2 is prevented. That is the curvature of the flex does not become less. If the apparatus 2 is resiliently flexible then the flexed state will be a stable equilibrium state.

If the interconnect 13 is positioned in an outer portion 92 of the apparatus 2 (on the outside of a bend of the apparatus 2 compared to the equilibrium plane 93) as illustrated in FIG. 2B, then if the second configuration 22 of the arrangement 10 prevents shortening of the interconnect 13 then less flexing of the apparatus 2 is prevented. That is the curvature of the flex does not become less. If the apparatus 2 is resiliently flexible then the flexed state will be a stable equilibrium state.

Referring to FIG. 2C, in the second configuration 22, the lock 16 at the second part 12 is in a locked state fixing the interconnect 13 to the body 4 and preventing any movement of the interconnect 13 relative to the body 4. Consequently, the portion 14 of the interconnect 13 between the first part 11 and the second part 12 has a fixed length. This prevents both more flexing and less flexing of the apparatus 2. That is the curvature of the flex is fixed.

Figure 3:
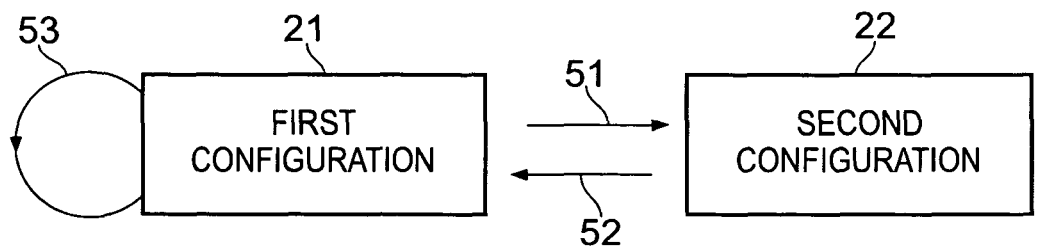
FIG. 3 illustrates a state diagram and transitions between the first configuration and the second configuration.

FIG. 3 illustrates a state diagram and transitions between the first configuration 21 and the second configuration 22.

The arrangement 10 may be configured to change from the first configuration 21 to the second configuration 22 in response to user actuation 51 such as, for example, bending and/or twisting.

The arrangement 10 is configured to change to the first configuration 21 from the second configuration 22 in response to user actuation 52 such as, for example, bending and/or twisting.

In the first configuration 21, more and less flexing are permitted 53.

In the second configuration, flexing is limited. For example, less flexing of the apparatus 2 may be prevented (FIGS. 2A-2C). In addition, more flexing of the apparatus 2 may be prevented (FIG. 2C).

The examples of FIGS. 1A to 1D and FIGS. 2A to 2C, have been used to describe, for arrangement 10, an interconnect 13 that extends longitudinally between the first part 11 and the second part 12.

The arrangement 10 may be a lengthwise arrangement, in which the first part 11 and the second part 12 are separated along the length-wise direction of the apparatus 2.

The arrangement 10 may be a width-wise arrangement, in which the first part 11 and the second part 12 are separated along the width-wise direction of the apparatus 2.

The apparatus 2 may comprise none, one or more than more length-wise arrangements 10.

The apparatus 2 may comprise none, one or more than more width-wise arrangements 10.

If more than one arrangement 10 is used, then in some but not necessarily all examples, all or some of the arrangements may be positioned on the same side of the equilibrium plane 93.

If more than one arrangement 10 is used, then in some but not necessarily all examples, all or some of the arrangements may be positioned on different sides of the equilibrium plane 93.

As previously described, the interconnect 13 may be stiff longitudinally and flexible transversely. In the examples of FIGS. 1A to 1D and FIGS. 2A to 2C, only longitudinal flexing in two-dimensions is illustrated. In these examples, flexibility in the transverse direction is flexibility in one direction (height-wise e.g. up-down in the FIGS. 1A-1D). However, in other examples, flexing may occur in three dimensions. In these examples, transverse flexibility includes flexibility in two orthogonal directions e.g. width-wise and height-wise (up-down and in-out in FIGS. 1A-1D). The longitudinal, height and width references are made in relation to the co-ordinate frame of the interconnect, which as described above may be aligned with the co-ordinate frame of the apparatus 2 so that 'longitudinal' relates to length of the apparatus and 'width' relates to width of the apparatus 2 or as described above may be aligned transversely with the co-ordinate frame of the apparatus 2 so that 'longitudinal' relates to width of the apparatus 2 and 'width' relates to length of the apparatus 2.

The interconnect 13 may for example be a bar. For the purposes of this document a bar is a structure where dimensions in one orthogonal direction are at least 5 times greater than dimensions in the other two orthogonal directions. For example, the interconnect 13 may be elongate in the longitudinal direction but short in the height-wise and width-wise directions (measured in the co-ordinate frame of the interconnect 13). The bar interconnect 13 may be part of a length-wise arrangement 10 or a width-wise arrangement 10.

The interconnect 13 may for example be a plate. For the purposes of this document a plate is a structure where two dimensions in two mutually orthogonal directions are at least five times greater than the dimension in the other orthogonal direction. For example, the interconnect 13 may be elongate in the longitudinal direction and the width-wise direction but short in the height-wise direction (measured in the co-ordinate frame of the interconnect 13). The plate interconnect 13 may be simultaneously part of a length-wise arrangement 10 and a width-wise arrangement 10. As an example, if the plate is rectangular, two diagonally opposing corners may be fixed in position and the other two diagonally opposing corners may have one or more locks 14. The pair-wise combinations of fixed positions and locks on each of the four edges of the rectangle creates two length-wise arrangements 10 and two width-wise arrangements 10.

FIGS. 4A-4F illustrate examples of how an apparatus 2 (and consequently its interconnect 13) may be flexed while in the first configuration. It also illustrates flexed states that may be locked by the second configuration 22. In these Figures the apparatus 2 comprises a display 102, which in some but not necessarily all examples, is a touch-sensitive display. The display 102 is flexible in these examples.

The apparatus 2 may be thin and flexible. It may, for example be a hand-portable apparatus that is sized to be carried in the palm of a user and/or fit into an inside jacket pocket. Some examples of the apparatus 2 may be placed into a trouser back pocket of a user. The apparatus 2 flexes as the user sits down.

For the purposes of the following description of FIGS. 4A-4F the apparatus 2 is notionally divided lengthwise into two sides 41, 42. In addition, inwards is used to describe the direction towards the display 102 along a vector normal to the plane of the display 102 when it is not flexed and outwards is used to described the direction away from the display 102 along the vector normal to the plane of the display 102 when it is not flexed.

FIG. 4A illustrates a length-wise bending of both sides 41, 42 of the apparatus 2 in the same outwards direction so that the body 4 is concave. The display 102 bows inwards away from a user.

FIG. 4B illustrates a length-wise bending of both sides 41, 42 of the apparatus 2 in the same inwards direction so that the body 4 is convex. The display 102 bows outwards towards a user.

FIG. 4C illustrates a length-wise bending of the apparatus so that one side 42 is outwardly curved but the other side 41 is not curved. The display 102 is partially concave curving outwards at the side 42 while remaining flat at the side 41.

FIG. 4D illustrates a length-wise twisting of the apparatus 2 of both sides 41, 42 in opposite directions so that the body 4 is twisted. The display 102 twists with the body 4.

FIG. 4E illustrates a length-wise bending of both sides 41, 42 of the apparatus 2 in different directions so that it is outwardly curved at the side 42 and inwardly curved at the side 41. The display 102 is partially concave curving outwards at the side 42 and partially convex curving inwards at the side 41.

FIG. 4F illustrates a length-wise bending of the sides 41, 42 of the apparatus 2 in different directions so that it is outwardly curved at the side 41 and inwardly curved at the side 42. The display 102 is partially concave curving outwards at the side 41 and partially convex curving inwards at the side 41.

Figure 6:
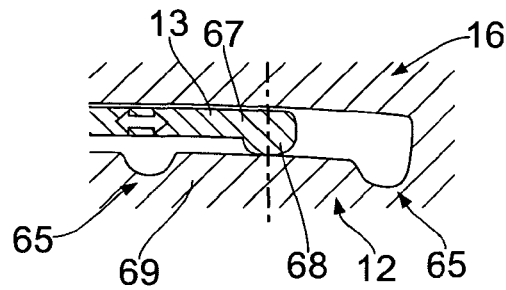
FIG. 6 illustrates an example of a lock.

FIGS. 5A & 5B and FIG. 6 illustrate two different examples of a lock 16. The lock 16 may be implemented as illustrated in those figures or implemented using an alternative mechanism.

FIG. 5A illustrates an arrangement 10 comprising a first part 11, an interconnect 13 and a second part 12 comprising a lock 16.

In this example, the interconnect 13 comprises a cylindrical metal bar that is supported by cylindrical journals 60. In this example the journals 60 depend from an inside face of a cavity. The interconnect 13 is mounted for rotation within the journals 60. The interconnect 13 is constrained by the journals 60 of the body 4 such that flexing of the body 4 by a user causes flexing of the interconnect 13.

A stop 64 keeps one end 63 of the interconnect 13 fixed to the first part 11 when the apparatus 2 is flexed.

The other end 67 of the interconnect 13 comprises a projection 68 that extends substantially orthogonally from the cylindrical axis of the interconnect 13. When the interconnect 13 is rotated, the projection 68 moves from an unlocked position to a locked position. In the locked position the projection engages with a corresponding aperture 65 in a retainer 69. In the unlocked position the projection does not engage with a corresponding aperture 65 in the retainer 69. The retainer 69 is fixed at the second part 12.

The projection 68 and aperture 65 together form a lock 16. When the projection 68 is in the locked position, the lock 16 has a locked state. The projection 68 of the interconnect 13 is then fixed at the second position 12.

FIG. 5B illustrates the rotation of the interconnect 13 so that the projection 65 of the interconnect 13 engages within an aperture 65. The retainer 69 comprises a number of longitudinally spaced apertures 65. The length of the portion 14 of the interconnect 13 between the first part 11 and the second part 12 can be controlled by selecting an appropriate aperture 65 and engaging that aperture 65 with the projection 68. Although the actual physical length of the interconnect 13 may be fixed, its length measured relative to the body 4 can be changed.

In the first configuration 21, the projection 68 is not engaged with an aperture 65 and the end 67 of the interconnect can move freely in a longitudinal direction with respect to the second part 12.

In the second configuration 22, the projection 68 is engaged with an aperture 65 and the end 67 of the interconnect 13 is fixed with respect to the second part 12 and cannot move in a longitudinal direction relative to the retainer 69.

The projection 68 and aperture 65 function in a manner similar to a tenon and a mortice in a latch.

A user operated actuator may be used to cause the interconnect 13 to rotate and engage the aperture 65.

FIG. 6 illustrates part of an arrangement 10 comprising a first part 11, an interconnect 13, and a second part 12 (as previously described and illustrated in relations to FIGS. 1A-1D and FIGS. 2A-2C). The second part 12 comprises a different type lock 16 to that illustrated in FIGS. 5A and 5B.

In this example, the interconnect 13 comprises a flexible rod or plate. As previously described above, it is fixed at the first end 11 and is fixed at the second end 12 in the second configuration 22 and not fixed at the second end 12 in the first configuration 21.

The end 67 of the interconnect 13 comprises a rounded projection 68 that extends substantially orthogonally from the cylindrical axis of the interconnect 13. The interconnect 13 is biased to push the projection downwards towards a retainer 69. When the projection 68 is aligned with an aperture 65 in the retainer 69 it is pushed by the biased interconnect 13 into the aperture 65. Thus the projection 68 moves from an unlocked position to a locked position. In the locked position the rounded projection engages with a corresponding rounded aperture 65 in a retainer 69. In the unlocked position the projection does not engage with a corresponding aperture 65 in a retainer 69. The retainer 69 is fixed at the second part 12.

The projection 68 and aperture 65 together form a lock 16. When the projection 68 is in the locked position, the lock 16 has a locked state. The projection 68 of the interconnect 13 is then fixed at the second position 12.

The retainer 69 comprises a number of longitudinally spaced rounded apertures 65. The length of the portion 14 of the interconnect 13 between the first part 11 and the second part 12 can be controlled by selecting an appropriate aperture 65 and engaging that aperture 65 with the projection 68.

In the first configuration 21, the rounded projection 68 is not engaged with an aperture and the end 67 of the interconnect 13 can move freely in a longitudinal direction with respect to the second part 12.

In the second configuration 22, the rounded projection 68 is engaged with a rounded aperture 65 and the end 67 of the interconnect 13 is fixed with respect to the second part 12 and cannot easily move in a longitudinal direction.

The projection 68 and aperture 65 function in a manner similar to a rounded tenon and a correspondingly rounded mortice in a sliding latch.

In this example, the projection 68 of the interconnect 13 engages the aperture 65 automatically when it is aligned with the aperture 65.

Figure 7A:
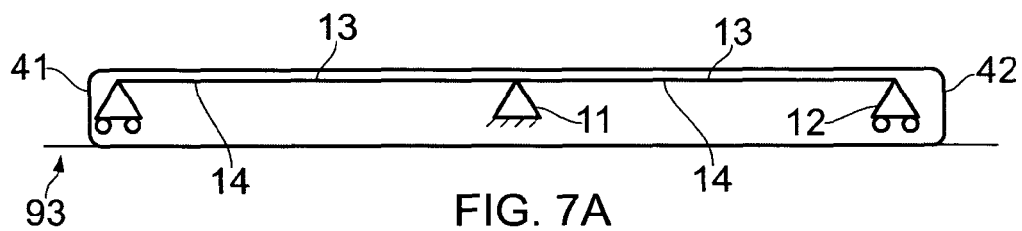
FIGS. 7A, 7B and 7C illustrate cross-sections through an example of an apparatus when it is in a first configuration.
Figure 7B:
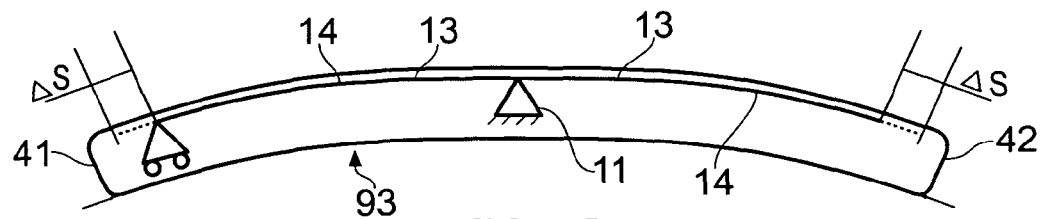
Figure 7C:
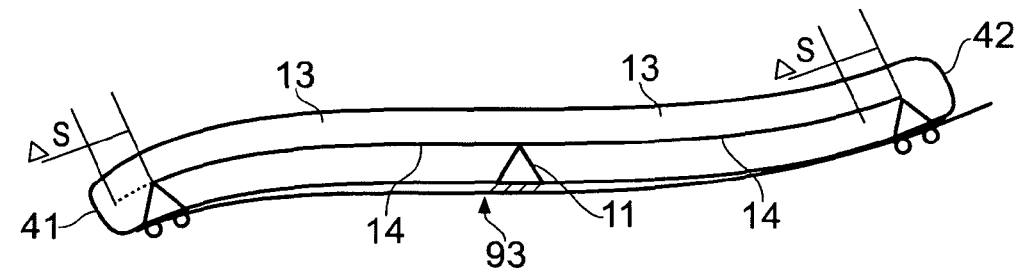

FIGS. 7A, 7B and 7C illustrate cross-sections through an example of an apparatus 2 when it is in a first configuration 21.

In this example, the first part 11 is located in a central position of the body 4 rather than at an extremity of a side 41, 42 of the body 4.

In this example, there are two second parts. One second part 12 is located at one extremity of the first side 41 and the other second part 12 is located at the other opposing extremity of the second side 42.

When the configuration of the apparatus 2 is changed from the first configuration 21 to the second configuration 22, a current flexed state of the apparatus is locked. Locking of the flexed state limits how the flexed state may change. It this example, the flexed state is fixed and be incapable of becoming more flexed and incapable of becoming less flexed. A lock 16 at each of the second parts 12 is used to prevent the length of the each of the portions 14, between the first part 11 and respective second part 12, from increasing or from decreasing or from both increasing and decreasing, when it is in a locked state. This enables each side 41, 42 of the apparatus 10 is be locked in a convexly flexed state and also a concavely flexed state.

In the first configuration 21, the interconnect 13 moves longitudinally with respect to the two second parts 12 as the apparatus 2 is bent.

In this example, the arrangement 10 and its interconnect 13 are spaced significantly from the equilibrium plane 93.

Figure 8:
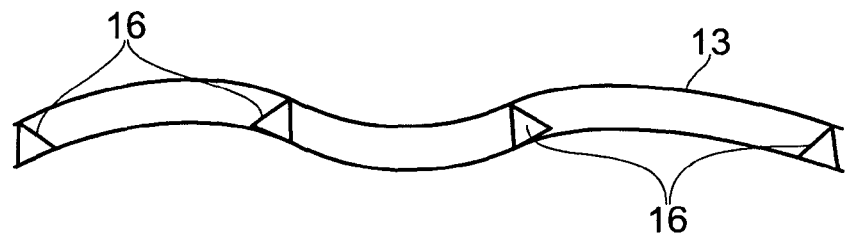
FIG. 8 illustrates an example of the apparatus where multiple longitudinally spaced locks are used, in the second configuration, to fix, at each of the locks, the interconnect to a lock.

FIG. 8 illustrates an example where multiple longitudinally spaced locks 16 are used, in the second configuration 22, to fix, at each of the locks, the interconnect 13 to a lock 16.

Figure 9A:
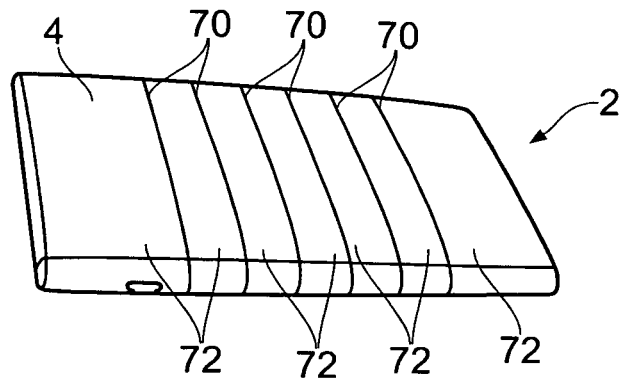
FIGS. 9A and 9B illustrate examples of the body of the apparatus.
Figure 9B:
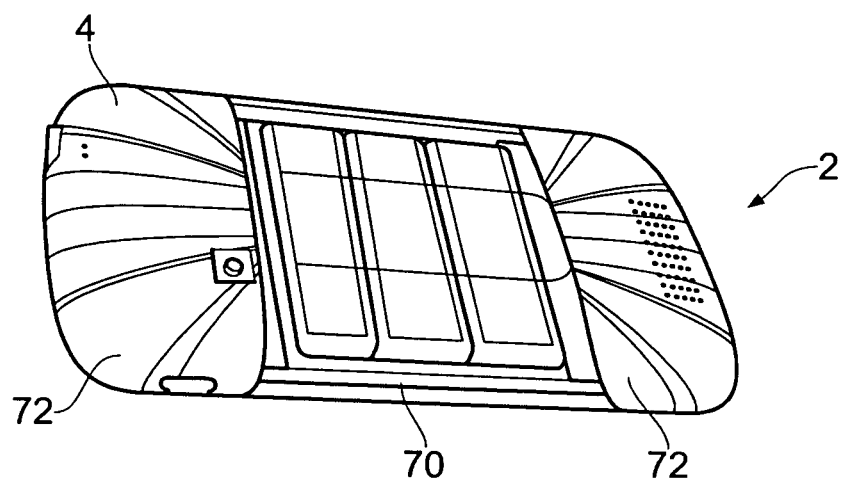

FIGS. 9A and 9B illustrate examples of the body 4 of the apparatus 2. In each figure, the body 4 comprises rigid, laterally extending, exterior portions 72 separated length-wise by a flexible laterally extending exterior portion 70.

In FIG. 9A, the body 4 comprises in length-wise series of rigid exterior portions 72. Each of the rigid exterior portions 72 has parallel laterally extending edges. Each of the rigid exterior portions 72 is separated from its adjacent portion 72 in the series by a gap. Each gap is filled by a flexible laterally extending exterior portion 70.

In FIG. 9B, the body 4 comprises two rigid exterior portions 72 separated by a flexible laterally extending exterior portion 70. Each of the rigid exterior portions 72 has parallel laterally extending edges.

FIGS. 10A, 10B, 10C and 10D illustrate some of the uses the apparatus 2 may have when in the second configuration 22.

Figure 10A:
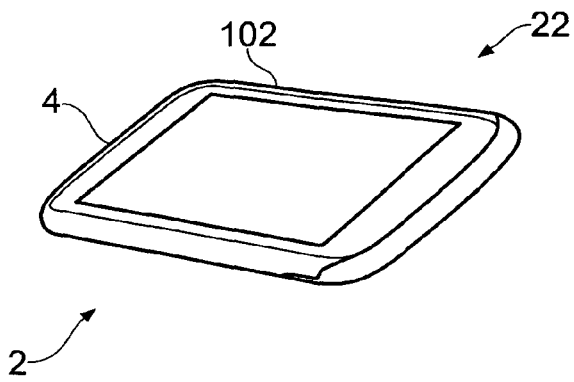
FIGS. 10A, 10B, 10C and 10D illustrate some of the uses the apparatus may have when in the second configuration.

In FIG. 10A, the apparatus 2 is in the second locked configuration 22 and is flat. The display 102 of the apparatus may be used as a touch input display.

Figure 10C:
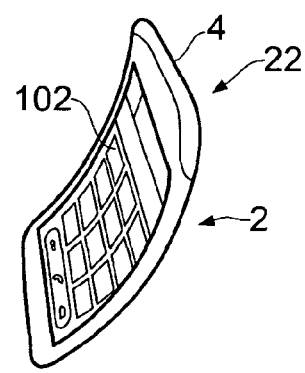
Figure 10B:
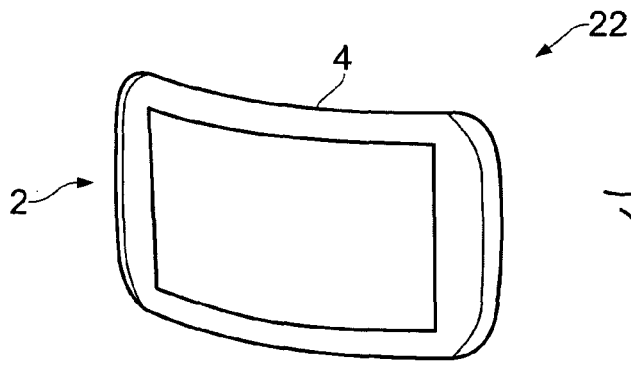

In FIG. 10B, the apparatus 2 is in the second locked configuration 22 and is convexly curved (see FIG. 4B). The apparatus 2 is stood on its side on a table top. It is stable because of the curvature of its side caused by the bending of the body 4 of the apparatus 2. The display 102 may be used to display video, pictures, television, movies etc. Alternatively, the apparatus 2 when positioned like this may be used as an alarm clock or a picture stand.

In FIG. 10C, the apparatus 2 is in the second locked configuration 22 and is concavely curved (see FIG. 4A). The apparatus 2 may be placed display-side down on a table and the curvature of the display-side of the apparatus caused by the bending of the body of the apparatus 2 keeps the display 102 spaced from the table. This may prevent scratches to the display 102.

Figure 10D:
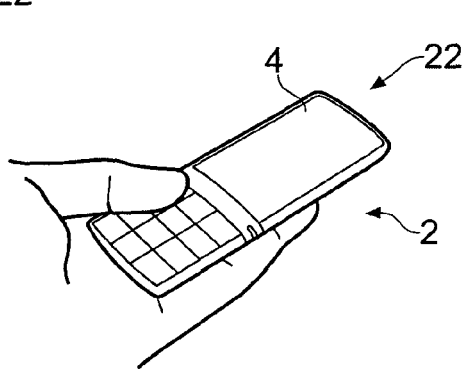

In FIG. 10D, the apparatus 2 is in the second locked configuration 22 and is convexly curved at an end of the apparatus where a key-board of the apparatus 2 is located and is concavely curved where a display 102 of the apparatus 2 is located (see FIG. 4E). The apparatus 2 may be comfortably held in the hand of a user with both the key pad and display presented at different angles to a user.

Figure 11:
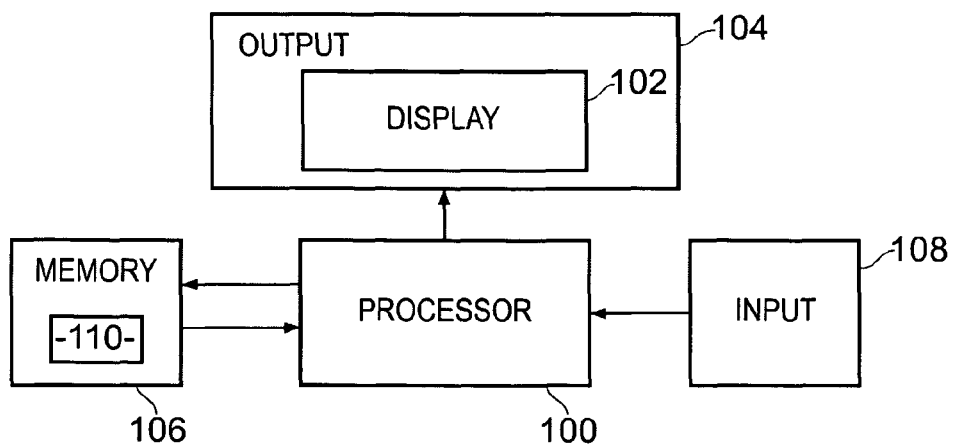
FIG. 11 illustrates functional components of an example of an apparatus 2.

FIG. 11 illustrates an example of the apparatus 2 and its components according to some but not necessarily all embodiments.

This example apparatus 2 comprises output circuitry 104, input circuitry 108, and a controller. The output circuitry 104 comprises a display 102.

The controller may be implemented using instructions that enable hardware functionality, for example, by using executable computer program instructions in a general-purpose or special-purpose processor that may be stored on a computer readable storage medium (disk, memory etc) to be executed by such a processor.

In this example, the controller is implemented using processing circuitry 100, a memory 106 and a computer program 110 stored in the memory 106.

The input circuitry 108 may comprise flex-sensors that detect flexing of the apparatus 2. Examples of suitable flex sensors include but are not limited to strain gauges, piezoelectric sensors or similar. The input signals from the flex-sensors may be used as user input commands to the processing circuitry 100 to control operation of the apparatus 2. In some but not necessarily all embodiments, the user is therefore able to provide user input commands to the apparatus 2 by flexing the apparatus 2.

The processing circuitry 100 may be able to control the transition of the apparatus 2 from the first configuration 21 to the second configuration and/or control the transition of the apparatus 2 from the second configuration to the first configuration 21. For example, the processing circuitry may control an actuator as part of the output circuitry 104 that rotates the interconnect 13 to engage an aperture 65 in the example of FIGS. 5A and 5B.

The processing circuitry 100 may be able to detect the transition of the apparatus 2 from the first configuration 21 to the second configuration 22 and/or control the transition of the apparatus 2 from the second configuration 22 to the first configuration 21. For example, the apparatus 2 may comprise one or more detectors as part of the input circuitry 108 that detect when the projection 68 engages an aperture 65 or a particular aperture 65 in the example arrangement 10 of FIG. 6. The detector may provide an input signal to the processing circuitry 100. In response to this input signal, the processing circuitry 100 may control the functionality of the apparatus 2 in dependence upon the second configuration, for example, as described with reference to FIGS. 10A to 10D.

The processing circuitry 100 may be a processor configured to read from and write to the memory 106. The processor 100 may also comprise an output interface via which data and/or commands are output by the processor 100 and an input interface via which data and/or commands are input to the processor 100.

The memory 106 stores a computer program 110 comprising computer program instructions that control the operation of the apparatus 2 when loaded into the processor 100. The computer program instructions 110 provide the logic and routines that enables the apparatus to perform the control methods described above, such as:

(i) controlling engagement/disengagement of the lock 16 (where appropriate) and/or (ii) controlling the response of the apparatus 2 to flexing and/or (ii) controlling which functionality is available for use in dependence upon the flex state of the apparatus 2 when it is in the first configuration 21 and/or when it is locked in the second configuration.

This may allows a user, for example, to select different operational modes of the apparatus 2 by flexing the apparatus to a particular flex state and then locking that flex-state by changing the configuration of the apparatus 2 from the first configuration 21 to the second configuration 22. The processor 100 by reading the memory 106 is able to load and execute the computer program 110.

As an example, the control circuitry 100 may be configured to control the display 102 to display images in landscape aspect ratio, in response to a change of configuration of the arrangement to the second configuration such as the second configuration 22 illustrated in FIG. 10B.

The apparatus 2 may therefore comprise: at least one processor; and at least one memory including computer program code the at least one memory and the computer program code configured to, with the at least one processor, cause the apparatus at least to perform: selecting different operational modes of the apparatus 2 in response to flexing of the apparatus to a particular flex state and then locking that flex-state by changing the configuration of the apparatus 2 from the first configuration 21 to the second configuration 22.

The computer program 110 may arrive at the apparatus 2 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 110. The delivery mechanism may be a signal configured to reliably transfer the computer program 110. The apparatus 2 may propagate or transmit the computer program 110 as a computer data signal.

Although the memory 106 is illustrated as a single component it may be implemented as one or more separate components some or all of which may be integrated/removable and/or may provide permanent/semi-permanent/dynamic/cached storage.

Although the processing circuitry 100 is illustrated as a single component it may be implemented as one or more separate components—none, some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a flexible body comprising an arrangement for limiting flexing of the body, the arrangement comprising:
   a first part within the body;
   a second part within the body;
   a flexible interconnect extending at least between the first part and the second part
   wherein the arrangement is configured to change between a first configuration, in which a portion of the interconnect between the first part and the second part is of a variable length configured to enable more and less bending of the interconnect, and a second configuration, in which the portion of the interconnect between the first part and the second part has a limited length that is configured to limit at least less bending of the interconnect.

2. An apparatus as claimed in claim 1, wherein the arrangement is configured to change from the first configuration to the second configuration in response to user actuation.

3. An apparatus as claimed in claim 1, wherein the arrangement is configured to change to the first configuration from the second configuration in response to user actuation.

4. An apparatus as claimed in claim 1 wherein the interconnect is configured to flex by bending.

5. An apparatus as claimed in claim 1, wherein the interconnect is configured to flex by twisting.

6. An apparatus as claimed in claim 1, wherein the first part has a fixed first position within the body and wherein the second part has a fixed second position within the body.

7. An apparatus as claimed in claim 1, wherein the first part has a fixed first position within the body at or towards a first extremity of the body and the second part has a fixed second position within the body at or towards a second extremity of the body, opposing the first longitudinal extremity of the body.

8. An apparatus as claimed in claim 1, wherein the interconnect extends longitudinally between the first part and the second part and wherein the interconnect is stiff longitudinally and flexible transversely.

9. An apparatus as claimed in claim 1, further comprising a lock at the second part that is unlocked in the first configuration and locked in the second configuration, wherein the interconnect is fixed at the first part and is lockable in position at the second part by the lock.

10. An apparatus as claimed in claim 9, wherein the lock is fixed to the body.

11. An apparatus as claimed in claim 9, wherein the lock is configured to engage automatically when the apparatus is bent.

12. An apparatus as claimed in claim 9, further comprising a further lock that is unlocked in the first configuration and locked in the second configuration, wherein the interconnect is lockable in position at the further lock.

13. An apparatus as claimed in claim 9, wherein the lock at the second part prevents movement of the interconnect relative to the body in the second configuration and allows movement of the interconnect relative to the body in the first configuration.

14. An apparatus as claimed in claim 1, wherein when the arrangement is in the second configuration, the portion of the interconnect between the first part and the second part has a fixed length.

15. An apparatus as claimed in claim 9, wherein the lock at the second part limits movement of the interconnect relative to the body in the second configuration and does not limit movement of the interconnect relative to the body in first configuration.

16. An apparatus as claimed in claim 1, wherein the apparatus is configured to enable user control of the apparatus using flexing.

17. An apparatus comprising:
a flexible body comprising an arrangement for limiting flexing of the body, the arrangement comprising:
 a first part within the body;
 a second part within the body;
 a flexible interconnect extending at least between the first part and the second part
wherein the arrangement is configured to change between a first configuration, in which a portion of the interconnect between the first part and the second part is of a variable length configured to enable more and less flexing of the interconnect, and a second configuration, in which the portion of the interconnect between the first part and the second part has a limited length that is configured to limit at least less flexing,
wherein the apparatus comprises a display and further comprising control circuitry configured to control the display to display images in landscape aspect ratio, in response to a change of configuration of the arrangement to the second configuration.

18. An apparatus as claimed in claim 1, configured as a hand-portable apparatus.

19. An apparatus comprising:
a flexible body comprising an arrangement for limiting flexing of the body, the arrangement comprising:
 a first part within the body;
 a second part within the body;
 a flexible interconnect extending at least between the first part and the second part
wherein the arrangement is configured to change between a first configuration, in which a portion of the interconnect between the first part and the second part is of a variable length configured to enable more and less flexing of the interconnect, and a second configuration, in which the portion of the interconnect between the first part and the second part has a limited length that is configured to limit at least less flexing,
wherein the apparatus comprises: at least one processor; and at least one non-transitory memory including computer program code, the at least one non-transitory memory and the computer program code configured to, with the at least one processor, cause the apparatus at least to perform:
selecting different operational modes of the apparatus in response to flexing of the apparatus to a particular flex state and locking that flex-state by changing the configuration of the apparatus from the first configuration to the second configuration.

20. An apparatus as claimed in claim 1, wherein in the second configuration the portion of the interconnect having the limited length is configured to limit more bending.

* * * * *